United States Patent
Eggleton et al.

(10) Patent No.: US 8,620,155 B2
(45) Date of Patent: Dec. 31, 2013

(54) OPTICAL SIGNAL TO NOISE MONITOR

(75) Inventors: Benjamin John Eggleton, Camperdown (AU); Mark Pelusi, Camperdown (AU); Timothy Iredale, Merewether (AU)

(73) Assignee: The University of Sydney, Sydney (AU)

( * ) Notice: Subject to any disclaimer, the term of this patent is extended or adjusted under 35 U.S.C. 154(b) by 356 days.

(21) Appl. No.: 12/664,196

(22) PCT Filed: Jun. 13, 2008

(86) PCT No.: PCT/AU2008/000858
§ 371 (c)(1),
(2), (4) Date: Dec. 11, 2009

(87) PCT Pub. No.: WO2008/151384
PCT Pub. Date: Dec. 18, 2008

(65) Prior Publication Data
US 2010/0178052 A1    Jul. 15, 2010

(30) Foreign Application Priority Data
Jun. 14, 2007    (AU) ............................... 2007903198

(51) Int. Cl.
*H04B 10/08*    (2011.01)
*H04B 17/00*    (2006.01)

(52) U.S. Cl.
USPC .............................................. 398/26; 398/33

(58) Field of Classification Search
USPC ........................................................ 398/26, 33
See application file for complete search history.

(56) References Cited

U.S. PATENT DOCUMENTS

| | | | | |
|---|---|---|---|---|
| 4,780,876 A * | 10/1988 | Smith et al. | ........................ | 372/3 |
| 5,499,313 A * | 3/1996 | Kleinerman | .................. | 385/123 |
| 5,515,192 A * | 5/1996 | Watanabe | ..................... | 398/198 |
| 5,592,282 A * | 1/1997 | Hartog | ............................. | 356/44 |
| 5,598,289 A * | 1/1997 | Watanabe | ..................... | 398/177 |
| 5,991,479 A * | 11/1999 | Kleinerman | ................... | 385/31 |
| 6,072,614 A * | 6/2000 | Roberts | ......................... | 398/177 |
| 6,108,474 A * | 8/2000 | Eggleton et al. | ............. | 385/122 |
| 6,626,588 B1 * | 9/2003 | Sasai et al. | ...................... | 398/32 |
| 6,907,052 B2 * | 6/2005 | Kozlowski et al. | ...... | 372/29.011 |
| 7,355,163 B2 * | 4/2008 | Watley et al. | ............ | 250/227.14 |
| 7,405,820 B2 * | 7/2008 | Lopez Torres et al. | ....... | 356/300 |
| 7,480,460 B2 * | 1/2009 | Colpitts et al. | ................ | 398/108 |
| 8,115,919 B2 * | 2/2012 | Yun et al. | ...................... | 356/301 |
| 8,369,669 B2 * | 2/2013 | Bouma et al. | ................ | 385/116 |
| 2002/0154291 A1 * | 10/2002 | Uchiyama et al. | ........... | 356/73.1 |

(Continued)

FOREIGN PATENT DOCUMENTS

| | | |
|---|---|---|
| JP | 05-231923 | 9/1993 |
| JP | 10200483 | 7/1998 |
| JP | 2005-332986 | 12/2005 |

OTHER PUBLICATIONS

International Search Report. Aug. 20, 2008.

*Primary Examiner* — Ken Vanderpuye
*Assistant Examiner* — Abbas H Alagheband
(74) *Attorney, Agent, or Firm* — Ballard Spahr LLP

(57) ABSTRACT

An optical noise monitoring method and monitor, the monitor comprising an optical transmitter for receiving at least a portion of an optical signal, a device arranged to extract a reflected optical signal comprising a portion of the optical signal back-reflected by stimulated Brillouin scattering in the optical transmitter, and a photodetector for receiving the reflected optical signal. The optical transmitter can scatter the optical signal by stimulated Brillouin scattering.

20 Claims, 9 Drawing Sheets

(56) References Cited

U.S. PATENT DOCUMENTS

| | | | |
|---|---|---|---|
| 2003/0090757 A1* | 5/2003 | Ohtani | 359/111 |
| 2003/0142392 A1* | 7/2003 | Strutz et al. | 359/337.2 |
| 2004/0136649 A1* | 7/2004 | Mangir et al. | 385/27 |
| 2005/0265405 A1* | 12/2005 | Mannstadt et al. | 372/30 |
| 2006/0139740 A1* | 6/2006 | Korolev et al. | 359/341.1 |
| 2006/0165336 A1* | 7/2006 | Mangir et al. | 385/1 |
| 2007/0171402 A1* | 7/2007 | Watley et al. | 356/73.1 |
| 2009/0303460 A1* | 12/2009 | Habel et al. | 356/32 |
| 2010/0178052 A1* | 7/2010 | Eggleton et al. | 398/26 |
| 2012/0063772 A1* | 3/2012 | Dahan et al. | 398/26 |

\* cited by examiner

OPTICAL SIGNAL TO NOISE MONITOR

CROSS REFERENCE TO RELATED APPLICATIONS

The present application is a National Phase Application of International Application No. PCT/AU2008/000858 filed Jun. 13, 2008, which claims priority to Australian Patent Application No. 2007903198 filed Jun. 14, 2007, which applications are incorporated herein fully by this reference.

FIELD OF THE INVENTION

The present invention relates to a method and apparatus for monitoring optical signal to noise, of particular but by no means exclusive application in measuring the signal to noise ratio of an optical signal.

BACKGROUND OF THE INVENTION

Optical signal degradation occurs in optical communication systems, owing to factors such as amplified spontaneous emission (ASE) noise. This degradation is monitored and compensated for to improve system performance. For example, one approach involves providing real-time feedback of signal parameters (such as optical signal-to-noise ratio (OSNR)) to optical amplifiers in an effort to reduce the contributions of these optical amplifiers to the signal corruption [1].

However, in systems where bit-rates approach or exceed 40 Gb/s contemporary electronic monitoring techniques are limited in their response to the rapidly varying signal envelopes. Several all-optical noise-monitoring schemes have been suggested that are not restricted in this way, employing polarisation-nulling [2], [3], non-linear power transfer functions [4], [5], electrical carrier-to-noise monitoring [6] or semiconductor optical amplifiers [7]. These schemes make direct measurements of in-band noise which, unlike spectral techniques that interpolate out-of-band noise levels into the signal band, are not vulnerable to errors arising from the effects of routing and filtering.

However, such all-optical OSNR monitoring techniques can be limited in their sensitivity to changes in OSNR at levels greater than 20 dB [4], [5], and it is desirable to detect changes in OSNR in the region of 30 dB or higher so compensation can be made before noise corruption becomes significant. Furthermore these devices are often highly sensitive to variations in other signal parameters including chromatic dispersion [4],[5] and polarisation mode dispersion (PMD) [2],[4].

SUMMARY OF THE INVENTION

In a first broad aspect, the invention provides an optical noise monitor for monitoring noise in an optical signal, comprising:
an optical transmitter for receiving at least a portion of the optical signal;
a device arranged to extract a reflected optical signal comprising a portion of the optical signal back-reflected by stimulated Brillouin scattering (SBS) in the optical transmitter; and
a photodetector (such as one or more photodiodes or Avalanche photodetectors) for receiving the reflected optical signal;
wherein said optical transmitter scatters said optical signal by stimulated Brillouin scattering;
wherein a strength of said reflected optical signal received by said photodetector is inversely proportional to a level of noise in said optical signal; and
wherein said monitor is configured (i) to identify that noise is present in said optical signal based on a reduction in the strength of said reflected optical signal received by said photodetector, or (ii) to determine said level of noise in said optical signal based on the strength of said reflected optical signal received by said photodetector.

The optical transmitter may comprise one or more highly non-linear fibres or nonlinear planar integrated waveguides (such as chalcogenide waveguides).

Thus, when noise is present in the optical signal above the Brillouin threshold, the reduction in coherence of the pump wave results in a reduction in the efficiency of power being transferred to the Stokes wave. Hence, when the pulse train of the optical signal is clean (i.e. the OSNR is high), the SBS back-reflection is strong but when the pulses have noise (affecting amplitude and hence phase), the coherence in the SBS process is compromised and the back-reflected signal is much weaker. This difference can thus be used to identify the presence of noise.

The device may comprise, for example, a beamsplitter, a circulator or a 50:50 fused fibre coupler.

The monitor may include an amplifier to amplify the optical signal before admission to the optical transmitter.

The monitor may be adapted to determine the level of the noise in the optical signal from the strength of the reflected optical signal received by the photodetector by applying a calibration of the photodetector to the strength of the reflected optical signal received by the photodetector, the calibration of the photodetector relating the strength of the reflected optical signal received by the photodetector to signal-to-noise ratio.

The optical signal may comprise a portion of a monitored optical signal, the monitor being configured to tap the monitored optical signal and split off the portion.

In a second broad aspect, the invention provides an optical noise monitor for monitoring noise in an optical signal, comprising:
an optical transmitter for receiving at least a portion of the optical signal;
a photodetector for monitoring light transmitted by the optical transmitter;
wherein the optical transmitter scatters said optical signal by stimulated Brillouin scattering;
wherein a strength of reflection of the optical signal is inversely proportional to a level of noise in the optical signal so loss in the light transmitted by the optical transmitter received by the photodetector is indicative of a level of noise in the optical signal; and
wherein the monitor is configured (i) to identify that noise is present in the optical signal based on an increase in the strength of said light transmitted by said optical transmitter and received by said photodetector, or (ii) to determine the level of optical noise in the optical signal based on a strength of the light transmitted by the optical transmitter and received by said photodetector.

Thus, loss in the transmitted signal due to stimulated Brillouin scattering can alternatively be used to identify optical noise.

The method may comprise applying a calibration of the photodetector to the loss in the optical transmitter.

In a third broad aspect, the invention provides a method of monitoring optical noise, comprising:
Directing an optical signal (such as with a circulator) into an optical transmitter that scatters the optical signal by stimulated Brillouin scattering;

monitoring (such as with a photodetector) a reflected optical signal comprising a portion of said optical signal back-reflected by stimulated Brillouin scattering in the optical transmitter; and identifying that noise is present in said optical signal based on a reduction in the strength of said reflected optical signal or determining a level of noise in the optical signal based on the strength of the reflected optical signal.

As will be understood by those skilled in the art, each of the optional features of the above aspects of the invention may be employed where suitable in any combination with the other optional features and with any other aspect of the invention.

BRIEF DESCRIPTION OF THE DRAWING

In order that the present invention may be more clearly ascertained, an embodiment will now be described, by way of example, with reference to the accompanying drawing, in which.

DETAILED DESCRIPTION

Figure 1:
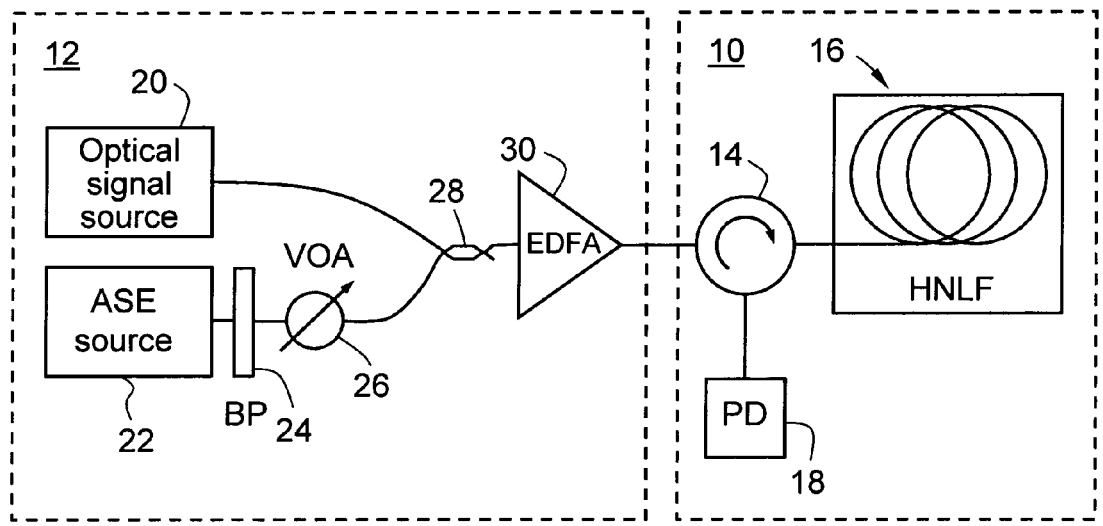
FIG. 1 is a schematic view of an optical signal-to-noise ratio (OSNR) monitor according to an embodiment of the invention, together with a noisy optical signal source.

An optical signal-to-noise ratio (OSNR) monitor according to an embodiment of the invention is shown schematically at 10 in FIG. 1, attached to a source 12 of a (noisy) optical signal. Monitor 10 includes a circulator 14 coupled to source 12, a Highly Non-Linear Fibre (HNLF) 16 coupled to a first output of circulator 14 and a low bandwidth, inexpensive optoelectronic photodetector in the form of photodiode 18 coupled to a second output of circulator 14. HNLF 16 has an attenuation of 0.58 dB, a nonlinearity coefficient $\gamma$ of 21 $W^{-1}.km^{-1}$, an effective length $L_{eff}$ of 946 m and a dispersion of zero at 1541 nm (with slope 0.026 $ps.km^{-1}.nm^{-2}$).

The noisy optical signal source 12 comprises an optical signal source 20 and an ASE (Amplified Spontaneous Emission) source 22 (for adding noise), a 1 nm bandpass (BP) filter 24, a variable optical attenuator (VOA) 26, a 50:50 coupler 28 and an erbium-doped fibre amplifier (EDFA) 30.

The output of ASE source 22 is filtered with BP filter 24 and—after passing through VOA 26—is combined with the optical signal from source 20 by coupler 28. EDFA 30 receives the combined signal from coupler 28, and amplifies the combined signal above the Brillouin threshold (discussed below). The amplified, combined signal is then output to the monitor 10.

In use, the optical signal (which consists, depending on the modulation scheme used, of a pulse train of "1" and "0") is thus directed through circulator 14 into HNLF 16. In practice this would generally comprise splitting a small portion of an optical signal from a transmission system and directing it into circulator 14 of monitor 10. The interaction between the pulse train and HNLF 16 drives a process called stimulated Brillouin scattering (SBS), which results in the partial back-reflection of the optical signal. SBS involves efficient transfer of power from a pump signal to a frequency shifted Stokes signal propagating in the reverse direction. The reverse scattering is a result of a grating structure formed by coherent interference of phonons arising from inelastic scattering of the pump wave in the fibre and only occurs significantly above a critical pump power known as the Brillouin threshold [8].

The present inventors have observed that when noise is present in the optical signal above this threshold the reduction in coherence of the pump wave results in a surprisingly dramatic reduction in the efficiency of power being transferred to the Stokes wave.

Hence, the SBS is separated in circulator 14 and measured with photodiode 18, which reads the time-averaged power of the back-reflected signal due to stimulated Brillouin scattering (SBS) in HNLF 16. When the pulse train is very 'clean' and the "1" and "0" pulses are well-defined (i.e. the OSNR is high), the SBS back-reflection is strong. However when the pulses have noise (affecting amplitude and phase), the coherence in the SBS process is compromised and the back-reflected signal is much weaker.

There is thus a correlation between the amplitude of the back-reflected signal and the OSNR, which the present inventors have found enables the resolution of changes in OSNR levels above 40 dB. Absolute measurements of OSNR can then be made following calibration of the system. It will thus be appreciated that as well as directing the optical signal into the HNLF 16, the circulator 14 provides a device for extracting the back-reflected signal from the HNLF 16. Further it will be appreciated that any appropriate optical element capable of producing Brillouin scattering can be employed instead of the HNLF 16, for example one or more non-linear planar integrated waveguides.

Figure 2:
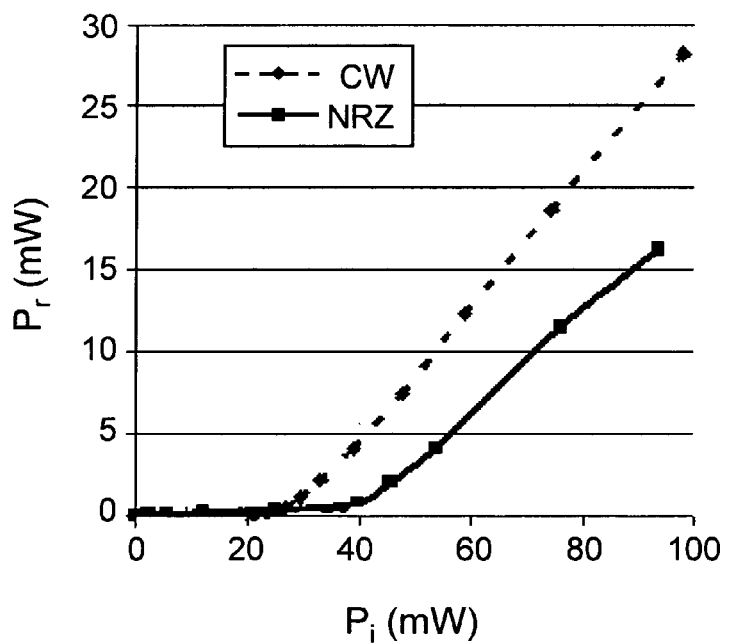
FIG. 2 is a plot of average reflected power (as a function of input power) generated by SBS from a noise-free CW signal and a NRZ PRBS data encoded signal experimentally measured with the monitor of FIG. 1.

SBS is a spectral effect that is dependent on the spectrum of both the pump signal and Brillouin-gain profile of the fibre [8]. Typically the Brillouin-gain spectrum has a width of ~20 MHz, with the most efficient SBS occurring for pump signals with narrower linewidths. FIG. 2 is a plot of average reflected power $P_r$ (mW) (as a function of input power $P_i$ (mW)), generated by SBS from two signals with differing spectra, and experimentally measured with monitor 10. The first signal was a noise-free continuous wave (CW) signal, the second a 40 Gb/s NRZ PRBS (pseudo-random binary sequence) data encoded signal at 1541 nm. This figure illustrates the effect of different spectral shapes, showing the dependence of the threshold level and efficiency of reflected power on these two signals.

Figure 3:
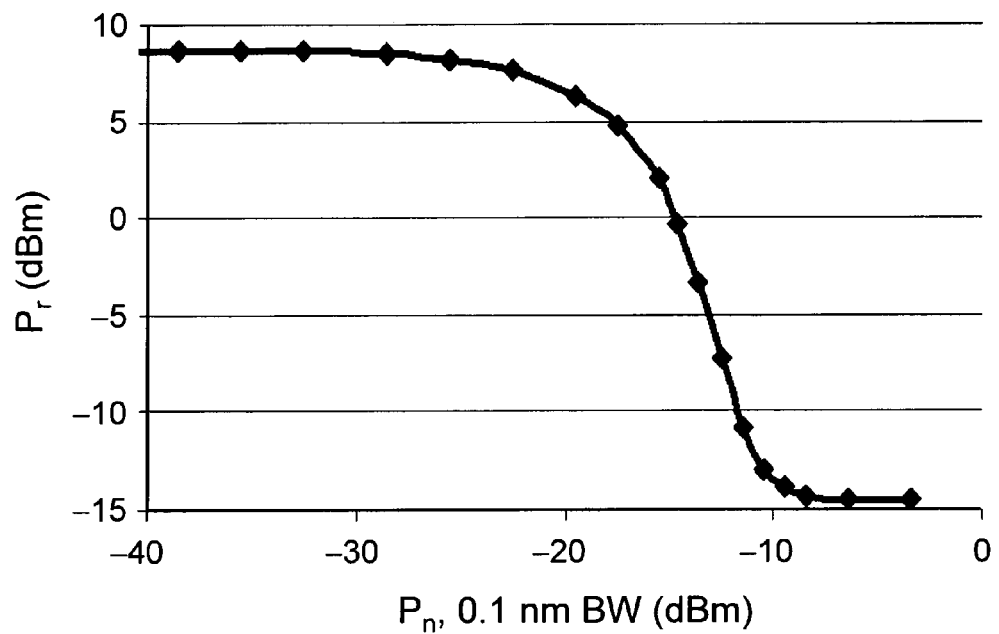
FIG. 3 is a plot of reflected power of SBS from a PRBS encoded NRZ signal due to co-propagating in-band ASE noise, against noise power, measured over a bandwidth of 0.1 nm with the monitor of FIG. 1.

Although data encoded signals at 40 Gb/s have spectral widths broader than that of the Brillouin-gain spectrum, NRZ signals have a prominent spectral peak at the carrier wavelength that is sufficiently narrow to promote SBS albeit at higher powers. The present inventors have observed that, when incoherent ASE noise within the signal channel band copropagates with such a signal in HNLF 16, it reduces the efficiency of power transfer between the data signal and its associated Stokes signal. This is observed as a change in the power of the Stokes signal, which reduces with increasing noise power. This is illustrated in FIG. 3, which is a plot of reflected power $P_r$ (dBm) of SBS from a PRBS encoded 40 Gb/s NRZ signal at 1541 nm due to co-propagating in-band ASE noise, against noise power $P_n$ (dBm) measured over a bandwidth of 0.1 nm added to the signal which had an average power of 1.25 mW amplified to have an average power of 80 mW. The reduction of efficiency of the SBS is evident.

Figure 4:
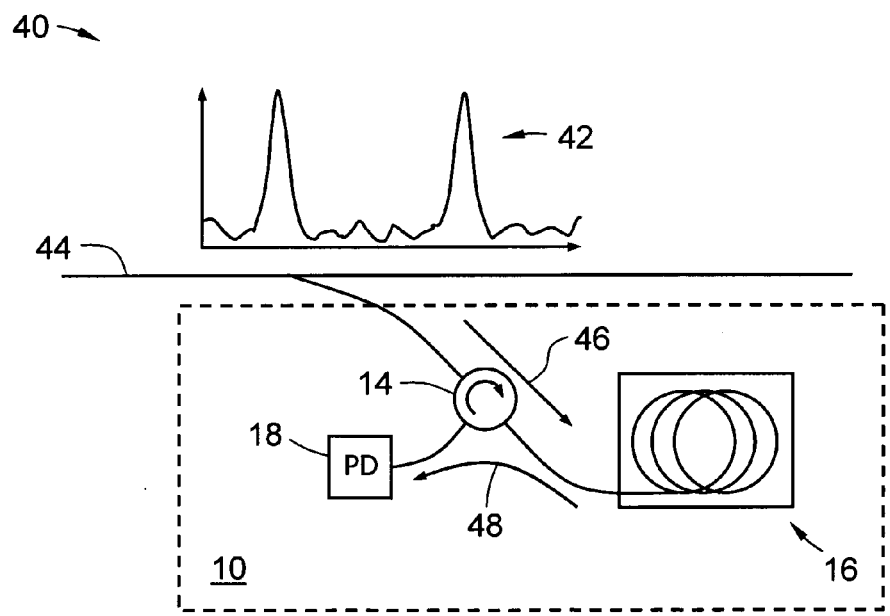
FIG. 4 is a schematic view of the monitor of FIG. 1 in a practice scheme for measuring OSNR in a signal from an optical network.

Monitor 10 thus operates—in practice—by tapping an amplified signal (provided by the noisy source 12 of FIG. 1) from an optical network. This general application is depicted schematically at 40 in FIG. 4. The optical signal 42 under consideration, being transmitted in an optical carrier 44 in an optical network, is tapped and amplified; the tapped and amplified signal 46 is directed into HNLF 16. The back-reflected power from HNLF 16 constitutes a monitoring signal 48 that is detected with photodiode 18. This provides a relatively simple and sensitive over a broad range of OSNRs as well as showing some robustness to other signal parameters.

EXAMPLES

Figure 5A:
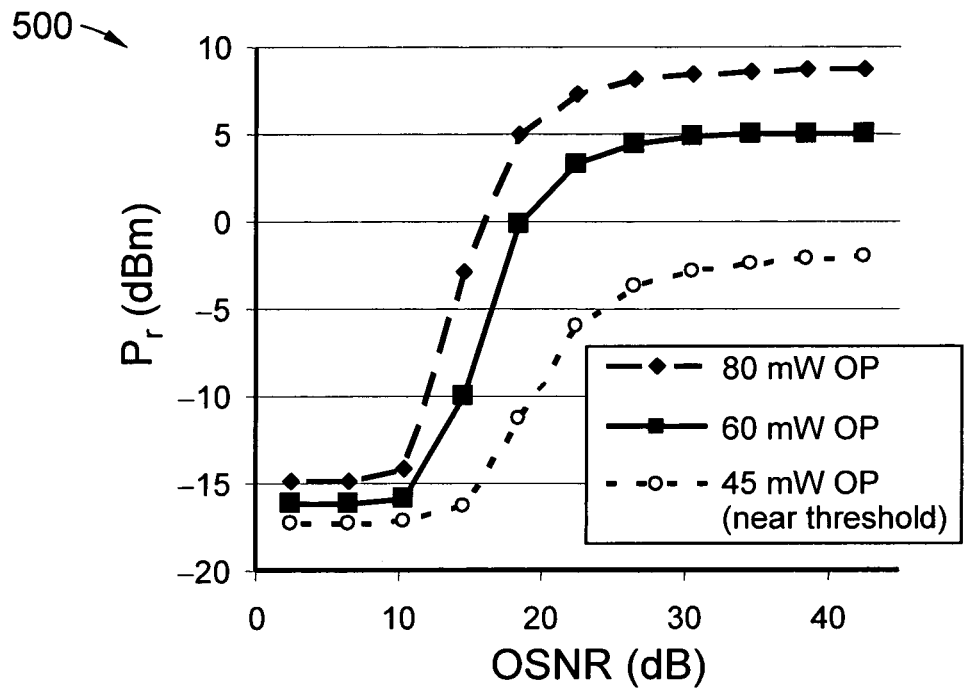
FIG. 5A presents plots of experimentally determined reflected power for a 40 Gb/s NRZ signal at 1541 nm, measured with the monitor of FIG. 1.
Figure 5B:
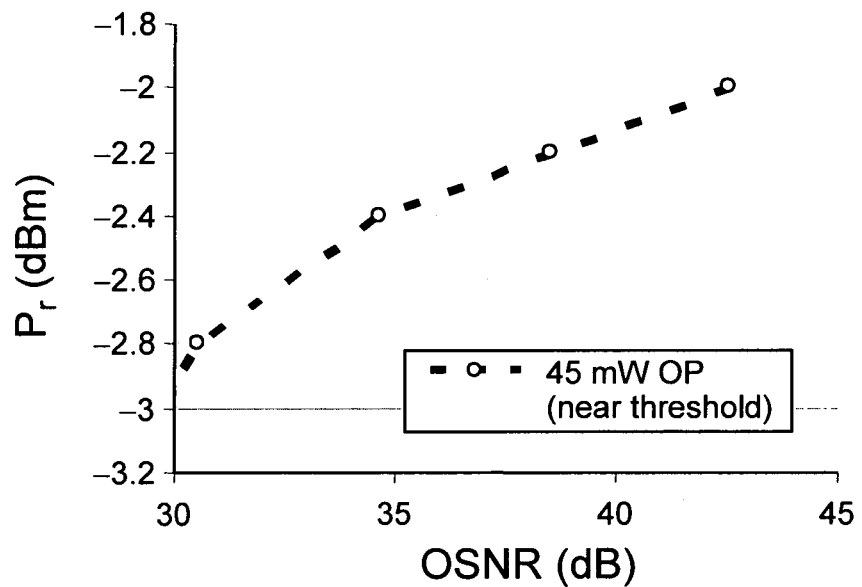
FIG. 5B is a detail of the plots of FIG. 5A, and depicts the monitoring curve for an operating point near the Brillouin threshold.

Experimental results for a 40 Gb/s NRZ signal at 1541 nm are shown in FIGS. 5A and 5B. The experiment was conducted at three different operating points (OP) (viz. 45 mW, 60 mW and 80mW) above the Brillouin threshold, which for this HNLF was ~40 mW, each giving OSNR monitoring with different sensitivity. FIG. 5A depicts OSNR monitoring curves from monitor 10 for a 1541.3 nm 40 Gb/s NRZ signal at the three operating points. FIG. 5B is a detail of FIG. 5A, and depicts the monitoring curve when monitor 10 is operated at OP=45 mW, hence near the Brillouin threshold, and shows appreciable sensitivity to high OSNR.

The experiments show that monitor 10 is highly sensitive to OSNR levels between 7 to 30 dB, where OSNR is defined as the ratio of the average signal power to the noise power over a spectrum width of 0.1 nm. Notably, when monitor 10 is operated closer to the Brillouin threshold its sensitivity to very low levels of noise is increased; provided that photodiode 18 can distinguish between 0.05 dB changes in the monitoring signal, monitor 10 is effective at OSNR levels greater than 40 dB.

Figure 6:
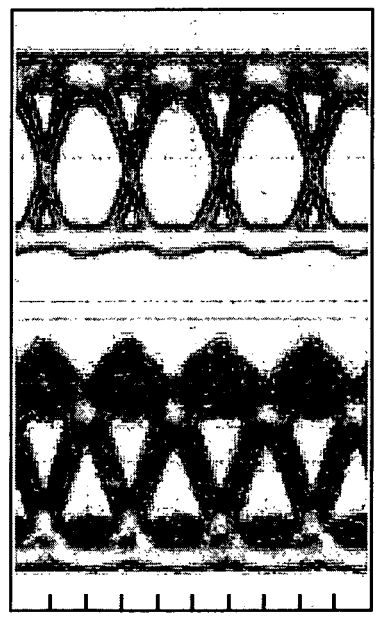
FIG. 6 comprises a pair of eye diagrams of a NRZ pulse train for zero applied dispersion, and for ~100 ps/nm applied dispersion due to 6 km of SMF.
Figure 7A:
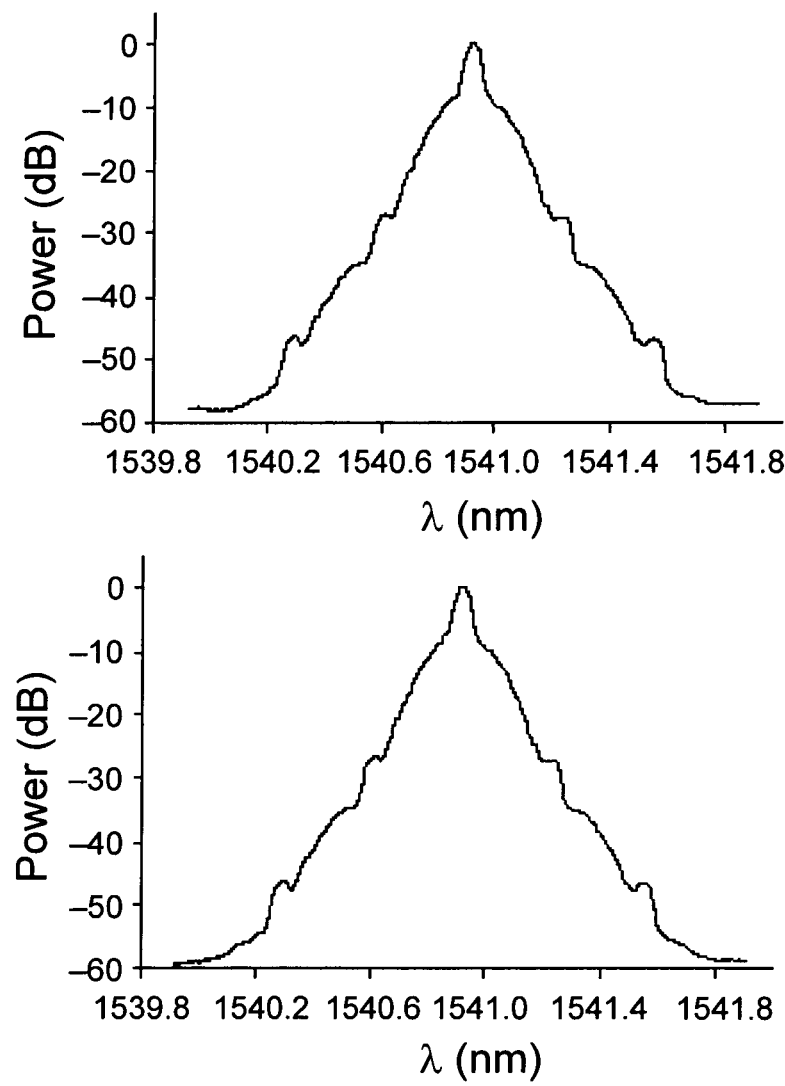
FIG. 7A comprises spectra of the zero and non-zero applied dispersion signals resulting from the measurements of FIG. 10.
Figure 7B:
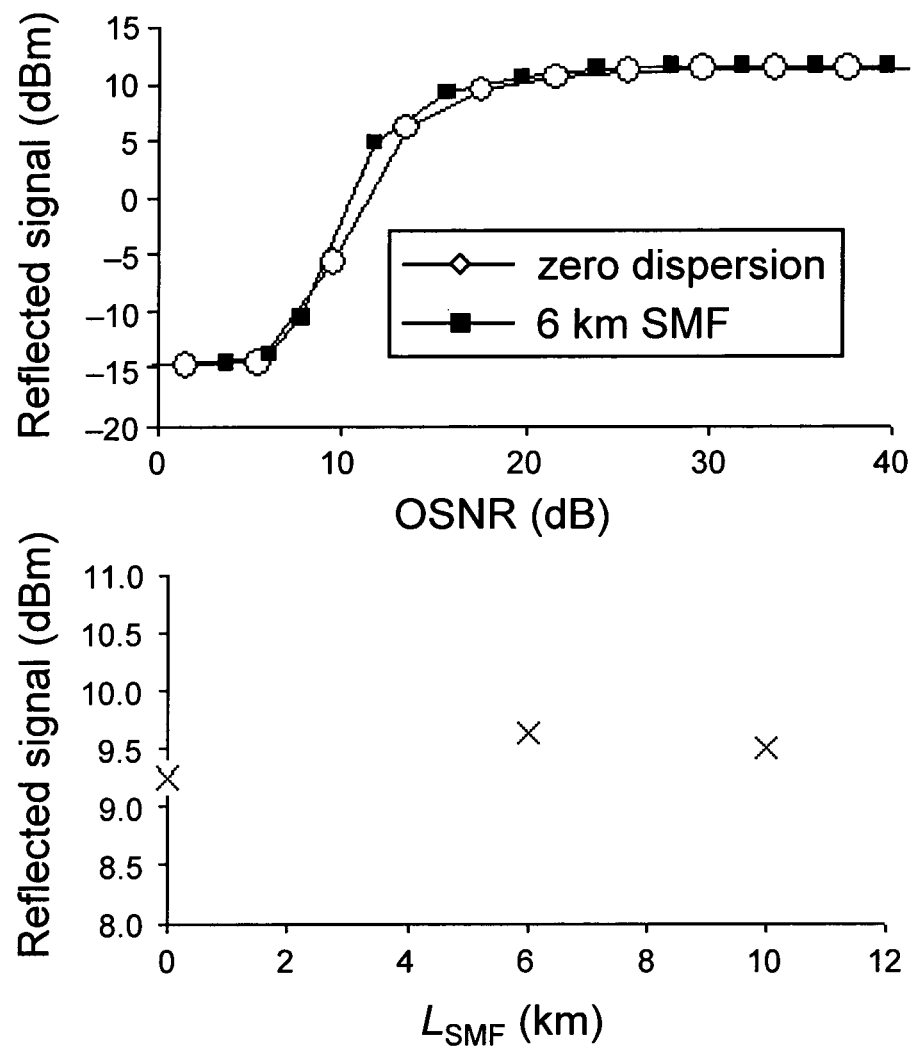
FIG. 7B comprises a plot of reflected signal against OSNR, showing the dispersion sensitivity of the monitoring curve with an 80 mW operating point, and a plot of back-reflected signal power against SMF length with OSNR 17.5±0.05 dB.

FIGS. 6, 7A and 7B illustrate the dispersion sensitivity of monitor 10 for NRZ encoded data. FIG. 6 has a pair of eye diagrams of the NRZ pulse train for (in the upper register) zero applied dispersion, and for (in the lower register) ~100 ps/nm applied dispersion due to 6 km of SMF showing considerable signal distortion due to dispersion. FIG. 7A comprises spectra of the resulting zero (upper register) and non-zero (lower register) applied dispersion signals that correspond to the eye-diagrams in FIG. 6. These figures indicate that while dispersion significantly distorts the signal it has negligible effect on the signal spectrum.

FIG. 7B comprises, in the upper register, a plot of the reflected signal (dBm) against OSNR (dB) and, in the lower register, a plot of the back-reflected signal power (dBm) against SMF length $L_{SMF}$ (km), which is proportional to group velocity dispersion, with OSNR 17.5±0.05 dB. These figures indicate the device has negligible sensitivity to dispersion because the spectrum is unchanged and SBS is dependent on the signal spectrum.

Figure 10:
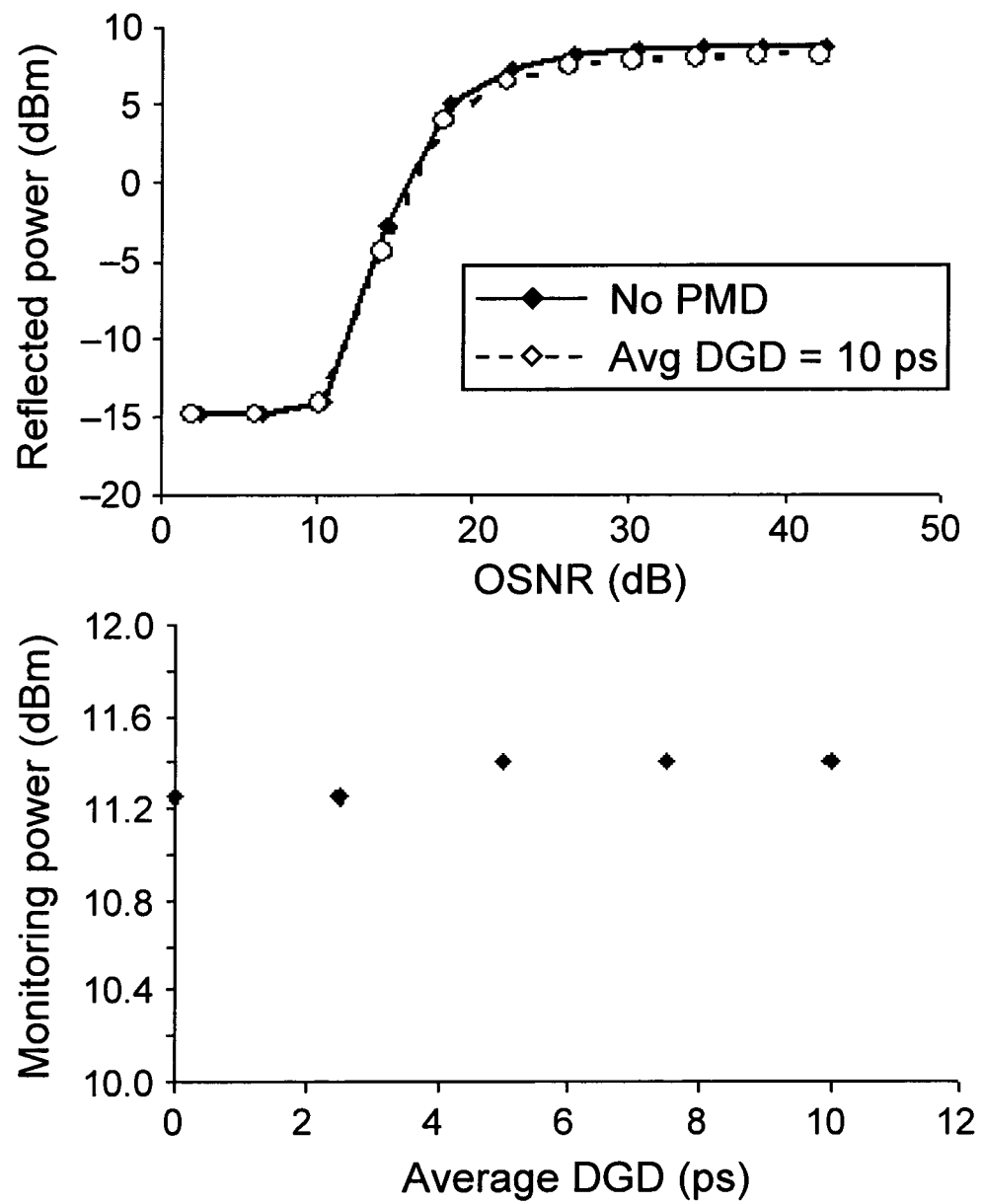
FIG. 10 compares the measured monitoring curve of a 40 Gb/s NRZ signal with time-varying group delay as a function of OSNR and that of a signal without applied PMD, and includes a plot of measured monitoring power as a function of average DGD.

Polarization mode dispersion (PMD) was then applied. Like dispersion, PMD is a time domain phenomenon that has little effect on the signal spectrum, and the resulting monitoring curves (for, respectively, an average differential group delay (DGD) of 10.0 ps and no PMD) are plotted in the upper register of FIG. 10. There is a negligible difference between the two curves. The lower register of FIG. 10 indicates negligible change in monitoring signal for varying levels of DGD such that FIG. 10 shows PMD appears to have little effect on the monitoring curve. This insensitivity to PMD indicates that monitor 10 is insensitive to the polarisation state of the signal.

Further experimental results obtained with an OSNR monitor according to the above embodiment are as follows.

Figure 8:
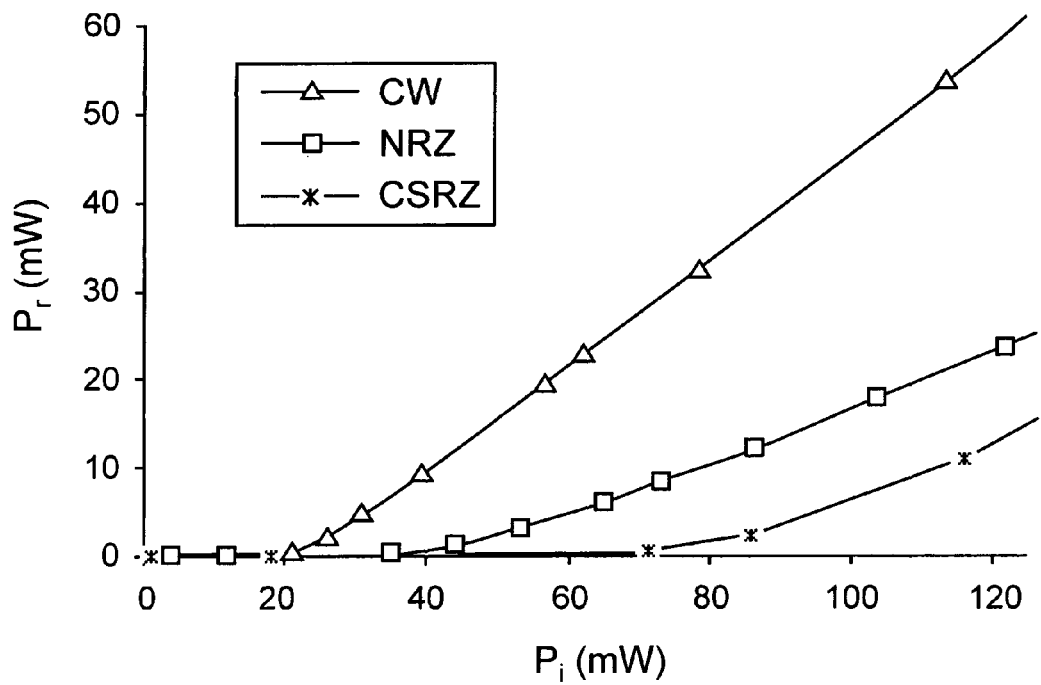
FIG. 8 is a plot of measured average reflected power generated by SBS as a function of input power from signals of different coding formats: CW, RZ and CSRZ.

FIG. 8 is a plot of measured average reflected power $P_r$ (mW) generated by SBS as a function of input power $P_i$ (mW), from signals of different coding formats: CW (no coding), 40 Gb/s Non-Return-to-Zero NRZ), Return-to-Zero (RZ) and Carrier-Suppressed Return to Zero (CSRZ) signals at 1541 nm wavelength encoded with a pseudo random bit sequence.

Figure 9B:
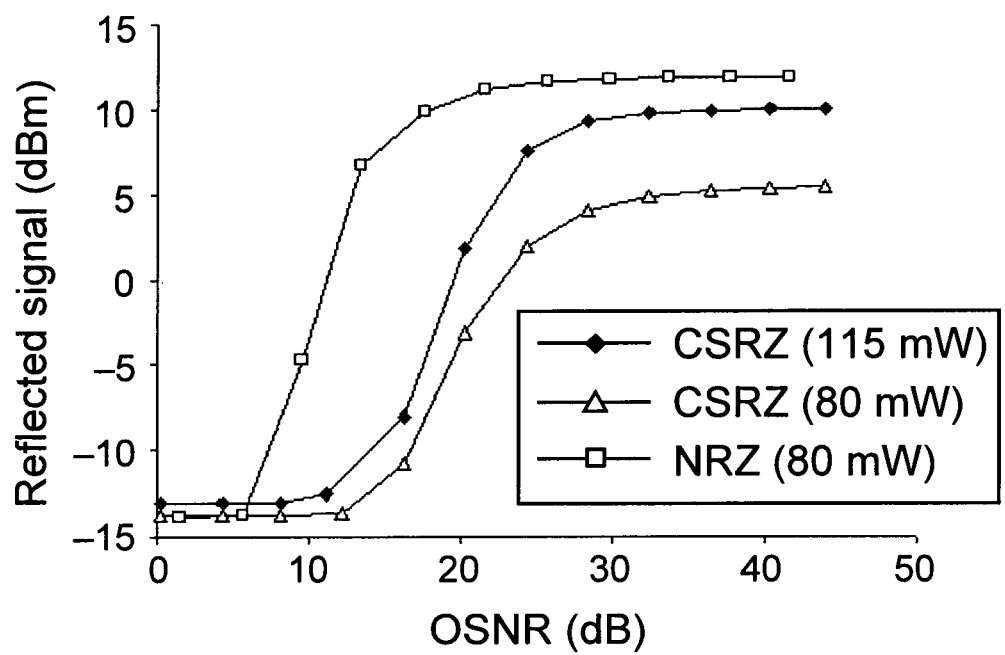
FIG. 9B is the OSNR monitoring curve for CSRZ-NRZ coding.
Figure 9A:
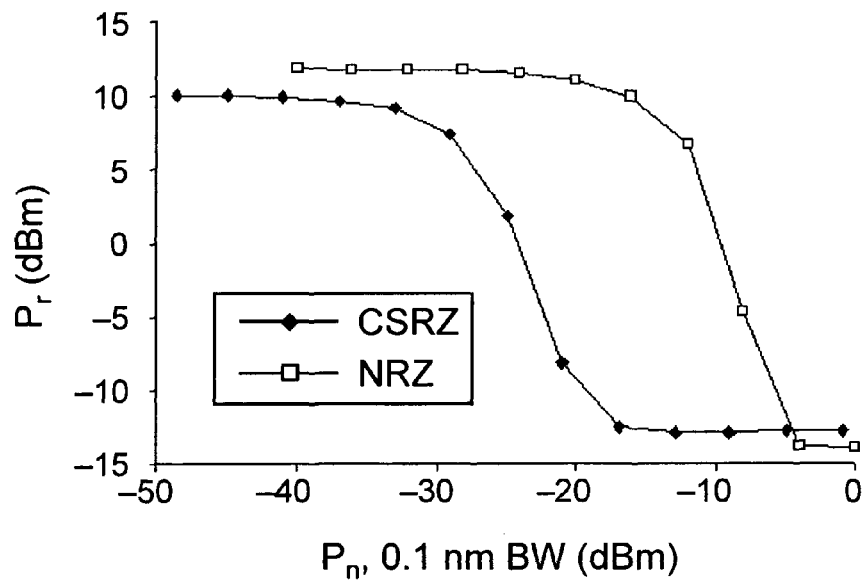
FIG. 9A is a plot of reflected power of the SBS response as a function of noise measured over a bandwidth of 0.1 nm.

FIG. 9A plots measured reflected power $P_r$ (dBm) of the SBS response as a function of noise $P_n$ (dBm) measured over a bandwidth of 0.1 nm; FIG. 9B is the OSNR monitoring curve for CSRZ-NRZ coding.

Figure 11:
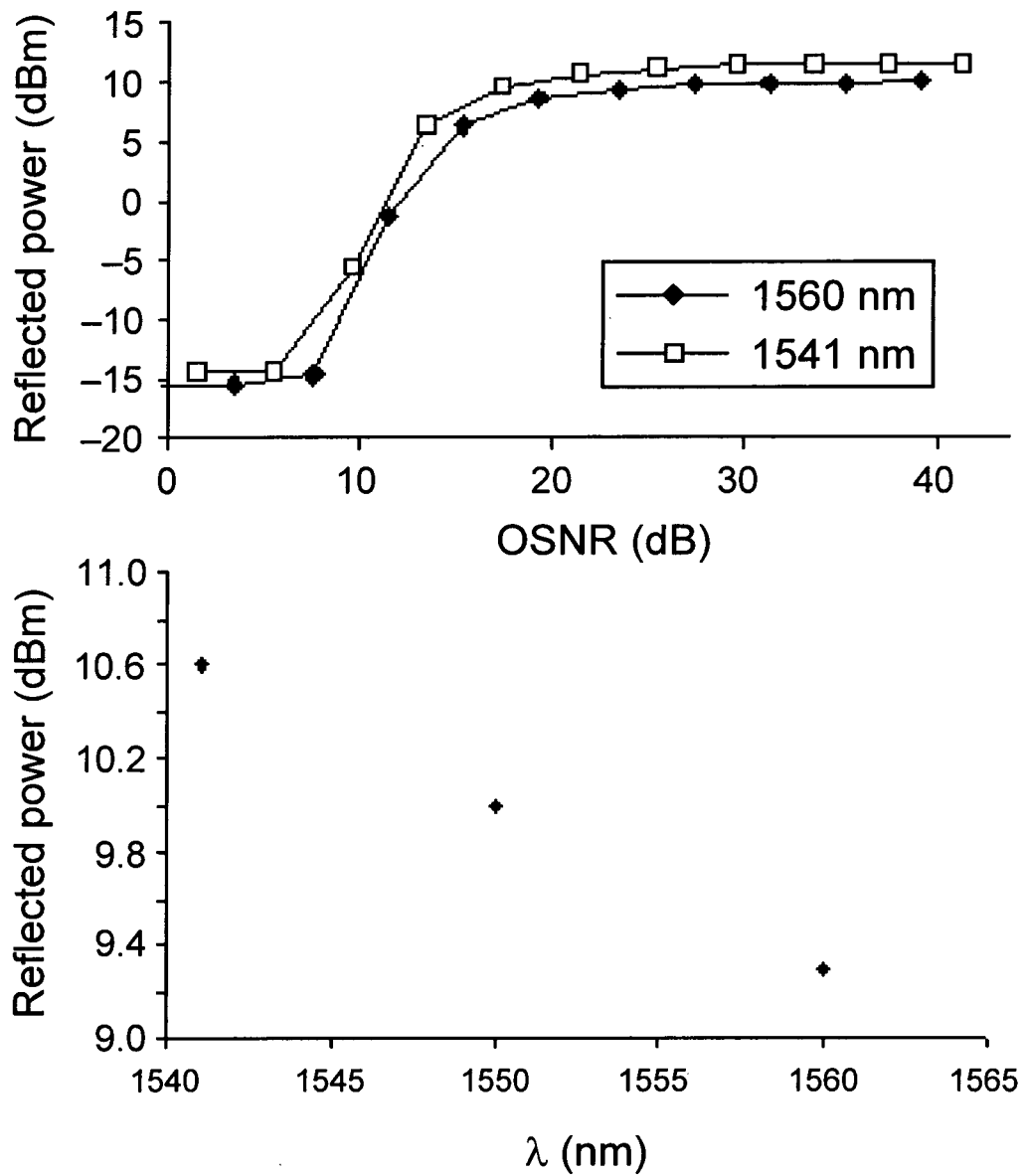
FIG. 11 compares the measured reflected power of a 1560 nm signal as a function of OSNR and that of a 1541 nm signal, and includes a plot of measured reflected power as a function of signal wavelength.

FIG. 11 compares—in its upper register—the measured reflected power (dBm) of a 1560 nm signal as a function of OSNR (dB) (plotted as solid diamonds) and that of a 1541 nm signal (plotted as open squares). The lower register of FIG. 11 is a plot of measured reflected power (dBm) as a function of signal wavelength λ (nm).

Monitor 10 should also operate with reasonable sensitivity with high bit-rate signals, though optimally—particularly at very, high bit-rates—when the spectrum of the associated signal is stable with time. Wide bandwidth spectra at high bit rates result in fewer modes containing large amounts of the total signal energy [9]. These intense modes initiate SBS with appreciable efficiency to be applied to this approach.

In conclusion, monitor 10 appears to provide an all-optical in-band OSNR monitor with a dynamic range exceeding 35 dB and significant sensitivity to extremely low noise; OSNR levels above 40 dB are resolvable. The technique is advantageous because it is insensitive to at least some time-domain signal phenomena, for example, group-velocity dispersion (referred to as dispersion above) and polarisation mode dispersion.

Modifications within the scope of the invention may be readily effected by those skilled in the art. It is to be understood, therefore, that this invention is not limited to the particular embodiments described by way of example hereinabove.

In the following claims and in the preceding description of the invention, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments of the invention.

Further, any reference herein to prior art is not intended to imply that such prior art forms or formed a part of the common general knowledge.

References

[1] D. C. Kilper, R. Bach, D. J. Blumenthal, D. Einstein, T. Landolsi, L. Ostar, M. Preiss, and A. E. Willner, "Optical performance monitoring," *Journal of Lightwave Technology*, 22(1) (2004) 294-304.

[2] J. H. Lee, D. K. Jung, C. H. Kim, and Y. C. Chung, "OSNR Monitoring Technique Using Polarization-Nulling Method," *IEEE Photonics Technology Letters*, 13(1) (2001) 88-90.

[3] J. H. Lee and Y. C. Chung, "Improved OSNR monitoring technique based on polarisation-nulling method," *Electronics Letters*, 37(15) (2001).

[4] R. Adams, M. Rochette, T. T. Ng, and B. J. Eggleton, "All-Optical In-Band OSNR Monitoring at 40 Gb/s Using a Nonlinear Optical Loop Mirror," *IEEE Photonics Technology Letters*, 18(3) (2006) 469-471.

[5] T. T. Ng, J. L. Blows, M. Rochette, J. A. Bolger, I. Littler, and B. J. Eggleton, "In-band OSNR and chromatic dispersion monitoring using a fibre optical parametric amplifier," *Optics Express*, vol. 13(14) (2005) 5542-5552.

[6] G. Rossi, T. E. Dimmick, and D. J. Blumenthal, "Optical Performance Monitoring in Reconfigurable WDM Optical Networks Using Subcarrier Multiplexing", *Journal of Lightwave Technology*, 18(12) (2000) 1639-1648.

[7] P. Vorreau, D. C. Kilper, and J. Leuthold, "Optical noise and dispersion monitoring with SOA-based optical 2R regenerator," *IEEE Photonics Technology. Letters*, 17(1) (2005) 244-246.

[8] G. P. Agrawal, *Nonlinear Fiber Optics*, Academic Press, 2001.

[9] T. Hirooka, S. Ono, K. Hagiuda, and M. Nakazawa, "Stimulated Brillouin scattering in dispersion-decreasing fiber with ultrahigh-speed femtosecond soliton pulse compression", *Optics Letters*, 30(4) (2005).

The invention claimed is:

1. An optical noise monitor for monitoring noise in an optical signal, comprising:
   an optical transmitter for receiving at least a portion of said optical signal;
   a device arranged to extract a reflected optical signal comprising a portion of said optical signal back-reflected by stimulated Brillouin scattering in said optical transmitter; and
   a photodetector for receiving said reflected optical signal;
   wherein said optical transmitter scatters said optical signal by stimulated Brillouin scattering;
   wherein, when the noise in the optical signal is above a Brillouin threshold, efficiency of power transfer to a Stokes wave is reduced and a strength of said reflected optical signal received by said photodetector is inversely proportional to a level of noise in said optical signal; and
   wherein said monitor is configured (i) to identify that noise is present in said optical signal based on a reduction in the strength of said reflected optical signal received by said photodetector, or (ii) to determine said level of noise in said optical signal based on the strength of said reflected optical signal received by said photodetector.

2. A monitor as claimed in claim 1, wherein said photodetector comprises one or more photodiodes or Avalanche photodetectors.

3. A monitor as claimed in claim 1, wherein said device comprises a beamsplitter, a circulator or a 50:50 fused fibre coupler.

4. A monitor as claimed in claim 1, wherein said optical transmitter comprises one or more highly non-linear fibres or one or more nonlinear planar integrated waveguides.

5. A monitor as claimed in claim 1, wherein said optical transmitter comprises one or more chalcogenide waveguides.

6. A monitor as claimed in claim 1, including an amplifier to amplify said optical signal before admission to said optical transmitter.

7. A monitor as claimed in claim 1, wherein said monitor is adapted to determine said level of said noise in said optical signal from said strength of said reflected optical signal received by said photodetector by applying a calibration of said photodetector to said strength of said reflected optical signal received by said photodetector, said calibration of said photodetector relating said strength of said reflected optical signal received by said photodetector to signal-to-noise ratio.

8. A monitor as claimed in claim 1, wherein said optical signal comprises a portion of a monitored optical signal, and said monitor is configured to tap said monitored optical signal and split off said portion.

9. An optical noise monitor for monitoring noise in an optical signal, comprising:
   an optical transmitter for receiving at least a portion of said optical signal;
   a photodetector for monitoring light transmitted by said optical transmitter;
   wherein said optical transmitter scatters said optical signal by stimulated Brillouin scattering;
   wherein, when the noise in the optical signal is above a Brillouin threshold, efficiency of power transfer to a Stokes wave is reduced and a strength of reflection of the optical signal is inversely proportional to a level of noise in the optical signal so loss in said light transmitted by said optical transmitter received by said photodetector is indicative of a level of noise in said optical signal; and
   wherein said monitor is configured (i) to identify that noise is present in said optical signal based on an increase in the strength of said light transmitted by said optical transmitter and received by said photodetector, or (ii) to determine said level of noise in said optical signal based on a strength of said light transmitted by said optical transmitter and received by said photodetector.

10. A method of monitoring optical noise, comprising:
    directing an optical signal into an optical transmitter that scatters said optical signal by stimulated Brillouin scattering;
    monitoring a reflected optical signal comprising a portion of said optical signal back-reflected by stimulated Brillouin scattering in said optical transmitter; and
    identifying that noise is present in said optical signal based on a reduction in the strength of said reflected optical signal or determining a level of noise in said optical signal based on said strength of said reflected optical signal;
    wherein, when the noise in the optical signal is above a Brillouin threshold, efficiency of power transfer to a Stokes wave is reduced and said strength of said reflected optical signal is inversely proportional to said level of noise in said optical signal.

11. A method as claimed in claim 10, including directing said optical signal into said optical transmitter with a circulator.

12. A method as claimed in claim 10, including monitoring said reflected optical signal with a photodetector.

13. A monitor as claimed in claim 1, wherein said monitor is adapted to determine said level of said noise in said optical signal from a strength of said reflected optical signal by applying a calibration of said photodetector to the strength of said reflected optical signal.

14. A method as claimed in claim 9, comprising applying a calibration of said photodetector.

15. A method as claimed in claim 10, including determining said level of noise in said optical signal from the strength of said reflected optical signal by applying a calibration of said photodetector to said strength of said reflected optical signal.

16. A method as claimed in claim 15, wherein said calibration of said photodetector relates said strength of said reflected optical signal to signal-to-noise ratio.

17. A method of monitoring optical noise, comprising:
    directing an optical signal into an optical transmitter that scatters said optical signal by stimulated Brillouin scattering;
    monitoring a transmitted optical signal comprising a portion of said optical signal transmitted by said optical transmitter; and
    identifying that noise is present in said optical signal based on an increase in a strength of said light transmitted by said optical transmitter, or determining a level of noise in said optical signal based on the strength of said light transmitted by said optical transmitter;
    wherein, when the noise in the optical signal is above a Brillouin threshold, efficiency of power transfer to a Stokes wave is reduced and a strength of reflection of the optical signal is inversely proportional to a level of noise in the optical signal so loss in said strength of said light transmitted by said optical transmitter is indicative of said level of noise in said optical signal.

18. A method as claimed in claim 17, including determining said level of noise in said optical signal by applying a calibration of said photodetector.

19. An optical noise monitor for monitoring noise in an optical signal, comprising:
    an optical transmission medium for receiving at least a portion of said optical signal;
    a device arranged to extract a reflected optical signal comprising a portion of said optical signal back-reflected by stimulated Brillouin scattering in said optical transmission medium; and
    a photodetector for receiving said reflected optical signal;
    wherein said optical transmission medium scatters said optical signal by stimulated Brillouin scattering;
    wherein, when the noise in the optical signal is above a Brillouin threshold, efficiency of power transfer to a Stokes wave is reduced and a strength of said reflected optical signal received by said photodetector is inversely proportional to a level of noise in said optical signal; and
    wherein said monitor is configured (i) to identify that noise is present in said optical signal based on a reduction in the strength of said reflected optical signal received by said photodetector, or (ii) to determine said level of noise in said optical signal based on the strength of said reflected optical signal received by said photodetector.

20. An optical noise monitor for monitoring noise in an optical signal, comprising:
    an optical transmission medium for receiving at least a portion of said optical signal;
    a photodetector for monitoring light transmitted by said optical transmission medium;
    wherein said optical transmission medium can scatters said optical signal by stimulated Brillouin scattering;
    wherein, when the noise in the optical signal is above a Brillouin threshold, efficiency of power transfer to a Stokes wave is reduced and a strength of reflection of the optical signal is inversely proportional to a level of noise in the optical signal so loss in said light transmitted by said optical transmission medium received by said photodetector is indicative of a level of noise in said optical signal; and
    wherein said monitor is configured (i) to identify that noise is present in said optical signal based on an increase in the strength of said light transmitted by said optical transmission medium and received by said photodetector, or (ii) to determine said level of noise in said optical signal based on the a strength of said light transmitted by said optical transmission medium and received by said photodetector.

\* \* \* \* \*

UNITED STATES PATENT AND TRADEMARK OFFICE
CERTIFICATE OF CORRECTION

PATENT NO.       : 8,620,155 B2
APPLICATION NO. : 12/664196
DATED            : December 31, 2013
INVENTOR(S)      : Eggleton et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 452 days.

Signed and Sealed this
Twenty-second Day of September, 2015

Michelle K. Lee
*Director of the United States Patent and Trademark Office*